METHOD AND APPARATUS FOR TRANSMITTING BINARY DATA

Filed Sept. 21, 1961 3 Sheets-Sheet 1

INVENTORS.
CONSTANTIN M. MELAS
EMIL HOPNER
BY
FRASER & BOGUCKI
ATTORNEYS

INVENTORS
CONSTANTIN M. MELAS
EMIL HOPNER
BY
FRASER & BOGUCKI
ATTORNEYS

METHOD AND APPARATUS FOR TRANSMITTING BINARY DATA

Filed Sept. 21, 1961 3 Sheets-Sheet 3

INVENTORS
CONSTANTIN M. MELAS
EMIL HOPNER
BY
FRASER & BOGUCKI
ATTORNEYS 3,242,262
Patented Mar. 22, 1966

1

3,242,262

METHOD AND APPARATUS FOR TRANSMITTING BINARY DATA

Constantin Michael Melas, San Jose, Calif., and Emil Hopner, Yorktown Heights, N.Y., assignors to International Business Machines Corporation, New York, N.Y., a corporation of New York Filed Sept. 21, 1961, Ser. No. 139,772
16 Claims. (Cl. 178—66)

This invention relates to a new and improved method and apparatus for the transmission of binary data, and more particularly to a new and improved binary data transmission system in which a carrier wave comprising at least two quadrature-phased components bears binary coded signal information.

In a copending application entitled, "Intelligence Communication System," filed June 23, 1958, Serial No. 743,576, in the name of Harold G. Markey, now U.S. Patent No. 3,088,069, there is described a system for the transmission of binary coded information by means of a carrier wave of reversible phase. For example, when the carrier wave is of a first phase, e.g. 0°, a binary value of "0" may be transmitted, while a carrier wave of opposite phase, e.g. 180°, may represent a binary "1" value. There is also disclosed in the Markey application an arrangement for synchronously demodulating the transmitted wave by means of a demodulating wave generated at a receiver. The demodulating wave is generated by a comparison of the received wave and the binary coded information carried by the wave so that no separate transmission of a reference wave for use in demodulating the transmitted wave is required.

While the above described system of 0°–180° phase modulation has been found to be quite satisfactory for the transmission of binary coded information, it is desirable in the development of improved forms of data processing equipment to effect as rapid a transmission of data as possible. Where a system of 0°–180° phase modulation is employed, only a single bit, i.e. digit, of binary coded information is transmitted at a time. Where a telephone or radio transmission link is employed, this means that the information must be transmitted from one location to another serially-by-bit unless several parallel transmission paths are employed.

In another copending application, filed September 11, 1961, Serial No. 137,342, entitled, "A Method and Apparatus for High Density Digital Data Magnetic Recording," in the name of Emil Hopner, a high density magnetic recording system is employed in which a phase modulated wave of reversible phase is utilized for the storage of binary coded information. Here also it is necessary to record the information serially-by-bit along the magnetic recording track.

In evaluating the systems of the aforementioned copending applications from the standpoint of communications theory, it has become apparent that additional information might be transmitted or stored with a material saving in transmission time and storage space.

Accordingly, it is a principal object of the present invention to provide a new and improved binary data transmission method in which at least two binary coded signals are transmitted simultaneously.

It is an additional object of the present invention to provide a binary data transmission system in which a phase modulated carrier wave is employed to bear at least two binary coded bits of information.

It is yet another object of the present invention to provide a new and improved phase modulated binary data transmission system in which the data is recovered by a process of synchronous demodulation by comparison with a demodulating wave generated under the control of the binary data carried by the phase modulated wave.

2

It is a still further object of the present invention to provide a new and improved demodulating wave generator for providing a wave of fixed reference phase in accordance with the binary coded information borne by a phase modulated carrier wave.

It is yet a still further object of the present invention to provide a new and improved data transmission system for transmitting and recovering binary coded information which is borne by a phase modulated wave comprising at least two quadrature-phased components.

In accordance with one aspect of the method and apparatus of the present invention there is provided a binary coded transmission system in which at least two quadrature-phased components of a carrier wave individually bear binary bits of information. The phase modulated wave may be transmitted by a suitable transmission link or stored in a suitable storage facility such as a magnetic recording for later recovery. A received phase modulated wave from either the transmission link or the storage facility is synchronously demodulated with reference to two separate quadrature-phased components to derive at least two binary coded signals. By means of a comparison between the received phase modulated wave and the derived binary coded signals, a demodulating wave of reference phase is generated for use in the synchronous demodulation process whereby no separate transmission link or facility is required for the synchronization of the carrier wave source at the transmitter and the demodulating wave source at the receiver.

A better understanding of the invention may be had from a reading of the following detailed description and an inspection of the drawings in which.

Figures 1, 2:
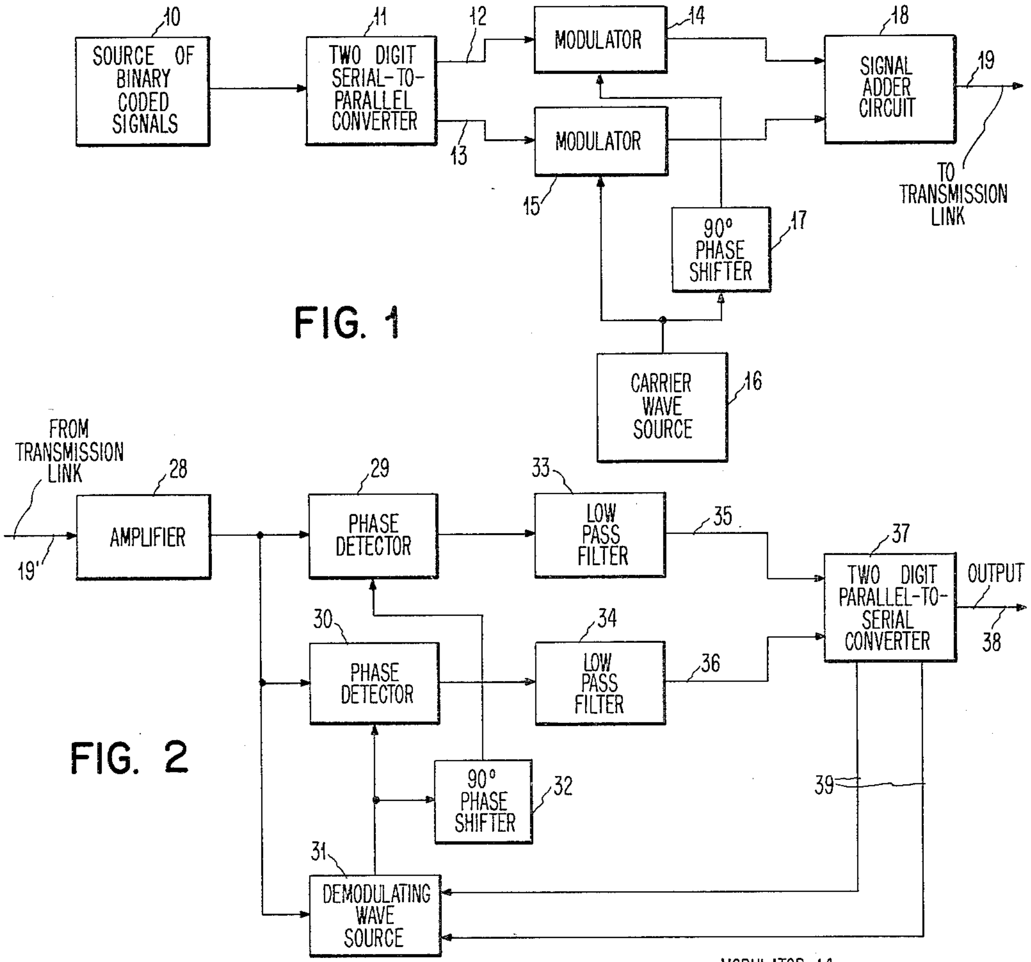
FIG. 1 is a block diagram of a portion of a binary coded data transmission system for generating a phase quadrature modulated wave in accordance with the invention.
FIG. 2 is a block diagram of a portion of a system for deriving binary coded signals from a phase quadrature modulated wave in accordance with the invention.
Figure 6:
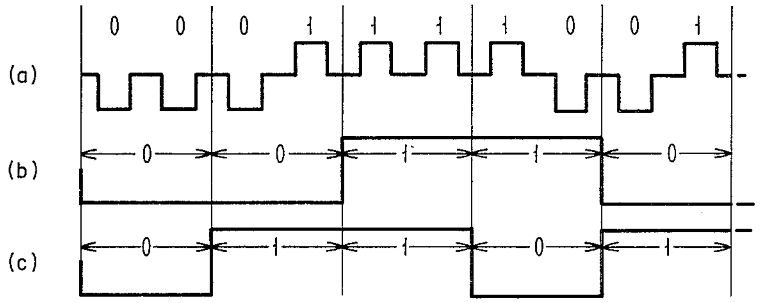
FIG. 6 is a set of graphical illustrations of electrical signals corresponding to the binary coded data appearing in the signal transmission and receiving systems of FIGS. 1 and 2.

In FIG. 1 there is illustrated a portion of a binary data transmission system in accordance with the invention in which binary coded information appears serially-by-bit from a source of binary coded signals 10. The source of binary coded signals may be adapted to provide a series of positive or negative going pulses each representing a binary value. For example, in FIG. 6*a* there is shown a signal train of electrical pulses appearing serially-by-bit and which may be obtained from the source of binary coded signals 10. The pulses from the source 10 are applied to a two-digit serial-to-parallel converter 11 in the system of FIG. 1. The converter 11 functions to combine the serially appearing bits of information into groups of two bits to provide parallel output signals corresponding to each successive pair of binary digits. Thus, in FIG. 6*b* there is shown an electrical signal having a binary value corresponding to the first bit or digit of each successive pair of digits provided by the source of binary coded signals 10. The waveform of FIG. 6*b* may appear on the output lead 12 from the converter 11. In similar fashion, FIG. 6*c* illustrates an output signal from the converter 11 which may appear on the lead 13 and which has a binary value corresponding to the second bit or digit of each successive pair of bits appearing in the serial train of pulses from the source of binary coded signals 10.

Although a serial-by-bit source 10 is shown in FIG. 1, the invention is not confined to an arrangement in which serially appearing binary information is transmitted and received. If desired, two separate unrelated channels of information may be transmitted in accordance with the invention by directly connecting the sources to the leads 12 and 13.

The signal leads 12 and 13 are respectively connected to the modulators 14 and 15. A wave of fixed phase and frequency from a carrier wave source 16 is applied directly to the modulator 15 and to the modulator 14 via a 90° phase shifter 17. At the output of the modulator 15 there is provided a wave of reversible phase corresponding to the binary information indicated in FIG. 6*c* representing, in the case where serial information is being transmitted, the second bit or digit of each pair of digits supplied by the source of binary coded signals 10. In a similar fashion, but in a phase quadrature relationship, the modulator 14 supplies an output signal of reversible phase corresponding to the first bit or digit of each pair of bits represented by the serially appearing pulses from the source of binary coded signals 10 corresponding to the binary information indicated in FIG. 6*b*. Therefore, at the output of the modulators 14 and 15 there are provided two waves of reversible phase which bear a 90° or phase quadrature relationship with respect to one another and which represent two separate binary bits of information.

The two phase quadrature related waves from the modulators 14 and 15 may be applied to a signal adder circuit 18 which combines the waves to provide a composite output signal on the lead 19. Since the waves from the modulators 14 and 15 are of constant amplitude, the addition of the waves from the modulators 14 and 15 produces a composite wave having a phase which is determined by the relative phases of the waves from the modulators 14 and 15. This process may be best understood by reference to the vector diagram of FIG. 8 in which the 0° vector 20 represents the carrier wave applied to the modulator 15, while the 90° vector 21 represents the carrier wave applied to the modulator 14. The phase quadrature relationship between these two waves is readily apparent from the vector diagram. When the two bits in the pair being transmitted are "0, 0," the resultant composite output signal on the lead 19 corresponds to the dashed vector 22. Where the two bits are "0, 1," on the other hand, the modulator 15 reverses the phase of the carrier wave so that the waves appearing at the outputs of the modulators 14 and 15 are represented by the vectors 21 and 23 with a resultant composite wave being provided on the lead 19 corresponding to the dashed vector 24. In similar fashion, when the two binary coded digits are "1, 1," the modulator 14 reverses the phase of its applied wave and provides an output signal represented by the vector 25 which, when combined with the signal represented by the vector 23, provides a composite output signal on the lead 19 having a phase represented by the dashed vector 26. Lastly, when the two digits are "1, 0" the output signal from the modulator 14 corresponds to the vector 25, while the output signal from the modulator 15 may be represented by the vector 20 so that the composite output signal on the lead 19 is represented by the dashed vector 27. A comparison of the possible output signals on the lead 19 as represented by the vectors 22, 24, 26 and 27 indicates that a phase-quadrature relationship is maintained between the various possible phases of the wave appearing on the lead 19. Yet, each individual phase of the composite signal represents two separate bits of information. Thus, when the output signal on the lead 19 has a phase as indicated by the vector 22, the pair of binary coded bits is "0, 0," when the phase is as shown by the vector 24 the binary bits are "0, 1," when the phase is as indicated by the vector 26, the binary bits are "1, 1," and finally when the phase is as indicated by the vector 27 the binary bits are "1, 0." The result is that in accordance with the present invention a transmission of two binary bits of information provides a two-fold increase over prior systems in the amount of data which may be transmitted within a given period of time. Similarly, where the system is applied to a storage of binary information, one-half as much storage space will be required.

A composite phase modulated signal appearing on the lead 19 of FIG. 1 may be transmitted to another location by means of a transmission link comprising a telephone line or radio transmitter and receiver as desired. In the alternative, the signal may be applied to a suitable storage system such as a magnetic recorder for later recovery. In any event, a received signal either from the transmission link or from the storage facility may be applied to the signal receiving system of FIG. 2 by means of a lead 19'. The signal appearing on the lead 19' is amplified in a conventional amplifier 28 and is applied to two separate synchronous demodulators which function as phase detectors 29 and 30. A suitable demodulating wave of fixed phase is applied to the phase detectors 29 and 30 so that the amplified received signal is subjected to a process of synchronous demodulation.

By demodulating with reference to two quadrature phased components two separate binary digits may be derived from the received wave. A wave from a demodulating wave source 31 is applied directly to the phase detector 30 and to the phase detector 29 via a 90° phase shifter 32. Since the demodulating waves applied to the phase detectors 29 and 30 bear a phase quadrature relationship to the received signal the requisite demodulation to derive the separate binary digits is achieved.

For proper operation the wave from the demodulating wave source must bear a fixed phase relationship to the received composite signal. In order to achieve the proper phase relationship the demodulating wave source 31 compares the received wave with the derived binary coded information in the manner described below.

In the receiving system of FIG. 2, the phase detectors 29 and 30 function to resolve the received wave into two quadrature-phased components. The outputs of the phase detectors 29 and 30 are connected to conventional low pass filters 33 and 34 which function to block the passage of the unwanted higher frequency signals generated in the demodulation process, so that the electrical signals on the leads 35 and 36 correspond to those applied to the modulators 14 and 15 of FIG. 1.

Where the system is adapted to transmit serial binary information the signals on the leads 35 and 36 are applied to a two digit parallel-to-serial converter 37 which recombines the signal in the proper order so that a series of binary coded signals appear on the output lead 38 corresponding to the signal train of FIG. 6*a*. However, signals corresponding to FIGS. 6*b* and *c* may also be derived from the converter 37 on the leads 39 for application to the demodulating wave source 31 within which a comparison is made between the received composite phase modulated wave and the derived binary coded information to generate a demodulating wave of fixed phase for application to the phase detectors 29 and 30. Once a proper phase relationship is established, the demodulating wave source 31 continues to provide a wave of reference phase so that binary information may be transmitted and received indefinitely without requiring a separate transmission of a wave from the carrier wave source 16. This further has the advantage that the problem of phase shift and frequency deviation encountered in most transmission links and storage systems is overcome.

Figure 3:
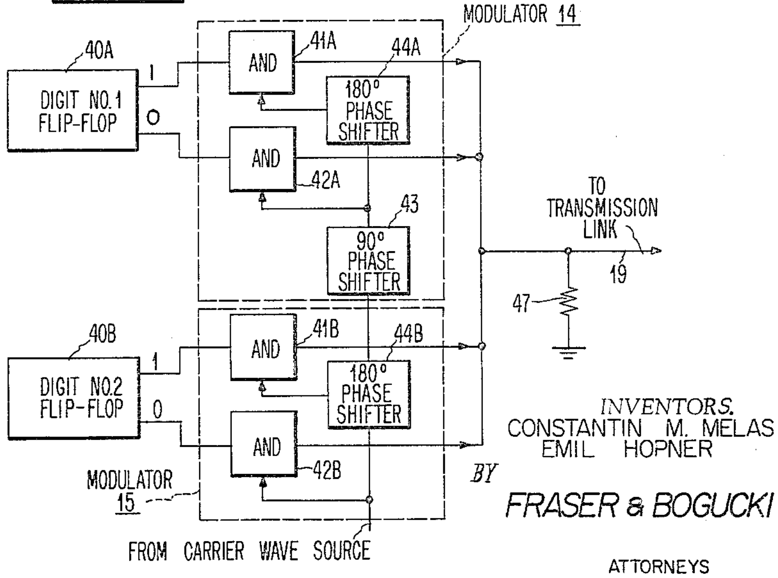
FIG. 3 is a combined block and schematic circuit diagram of a suitable modulator and signal addition circuit for use in the portion of the system shown in FIG. 1.
Figure 4:
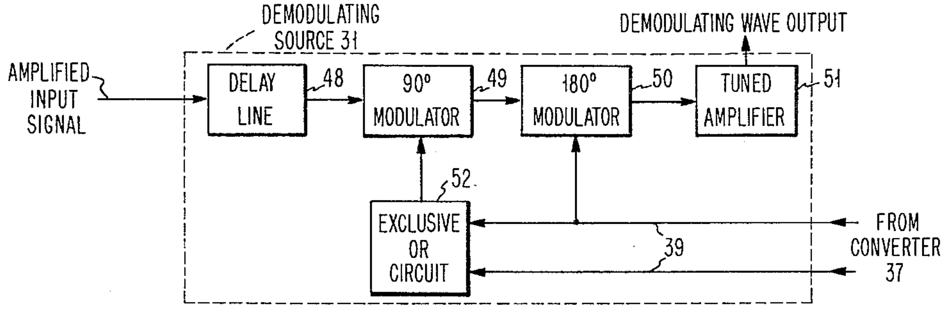
FIG. 4 is a block diagram of an arrangement for generating a demodulating wave in accordance with the invention for use in the portion of the system shown in FIG. 2.
Figure 5:
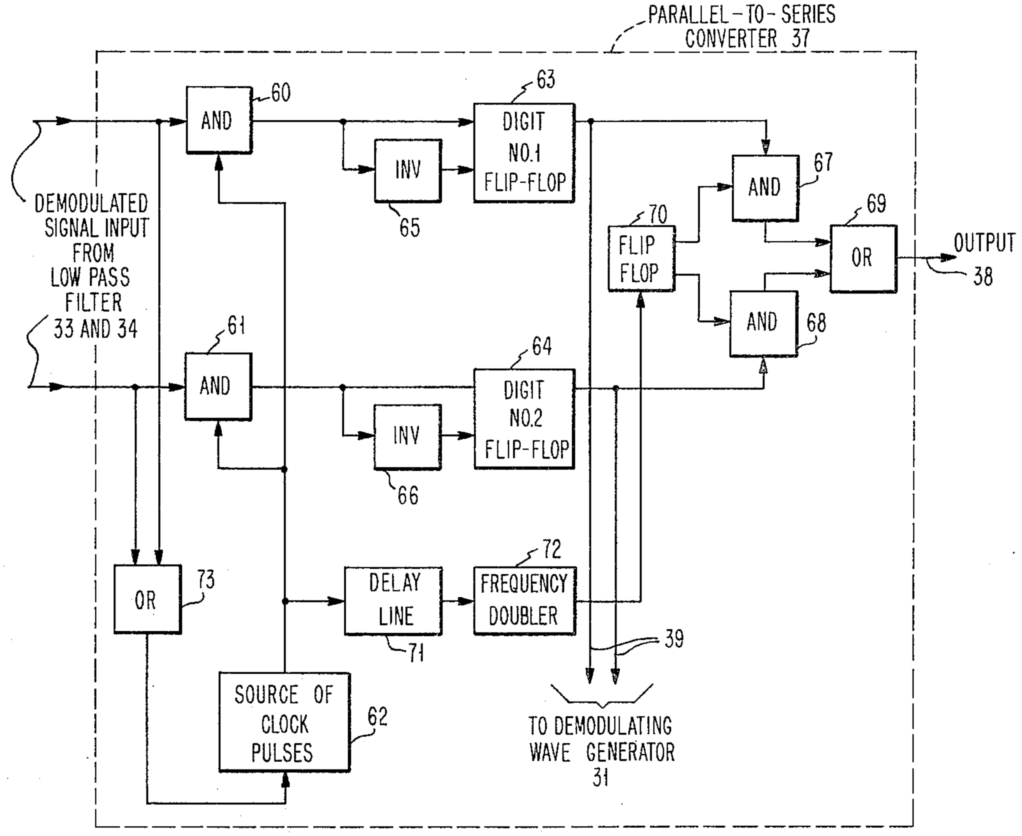
FIG. 5 is a block diagram of an arrangement for combining the signals derived from a phase modulated wave in the arrangement of FIG. 2 to provide binary coded output signals which appear serially-by-bit.

In order that the process of generating the composite and the deriving of the binary coded information borne by the phase quadrature phases of the binary coded wave may be better understood, there has been illustrated in FIGS. 3 through 5 exemplary arrangements for performing some of the functions indicated in the systems of FIGS. 1 and 2. Thus, in FIG. 3 there is shown a suitable arrangement for use in the system of FIG. 1 for the generation of a composite phase modulated wave.

Figure 8:
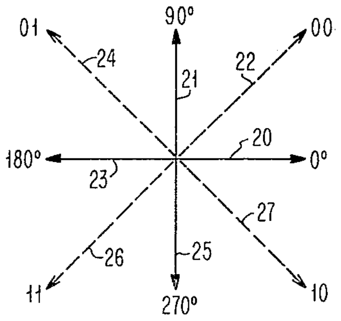
FIG. 8 is a vector diagram illustrating the manner in which the apparatus of FIG. 4 functions to generate a demodulating wave.

In FIG. 3 the binary coded information is provided at the input to the system by means of a pair of bistable circuits designated digit No. 1 flip-flop 40A and digit No. 2 of flip-flop 40B, respectively. Where the source of binary coded signals 10 of FIG. 1 provides a serial-by-bit output signal, the flip-flops 40A and 40B may constitute a portion of a selectively operable shift register into which each successive pair of binary digits is registered. On the other hand, where two separate binary coded signals are to be transmitted in parallel, the flip-flops 40A and 40B may comprise the elements into which the information is set or registered for transmission. In any event, the digit No. 1 flip-flop 40A is set to a selected binary value to provide on its output leads oppositely phased "high" and "low" level voltages in conventional fashion. Voltages from the digit No. 1 flip-flop 40A are applied to the modulator 14 which may include two separate gating circuits in the form of conventional AND circuits 41A and 42A. The signal from the carrier wave source 16 is applied to the AND circuits 41A and 42A via a 90° phase shifter 43. In addition, the wave applied to the upper AND circuit 41A is shifted in phase by 180° by means of a phase shifter 44A. Accordingly, there are available within the modulator 14 carrier waves having phases corresponding to the vectors 21 and 25 of 90° and 270° respectively (FIG. 8).

When the digit No. 1 flip-flop 40A is set to zero the AND gate 42A is opened to pass a wave of 90° phase while the AND circuit 41A is closed. On the other hand, when a binary "1" is set in the digit No. 1 flip-flop 40A the AND circuit 41A passes a wave of 270° phase while the AND circuit 42A is closed. The lower modulator 15 functions in similar fashion except that the wave from the carrier wave source is applied directly to lower AND circuit 42B and is shifted by 180° by a phase shifter 44B for application to the AND circuit 41B. Thus, in the lower modulator 15, when the digit No. 2 flip-flop 40B is set to zero the AND circuit 42B passes a wave of 0° phase. In contrast, when the digit No. 2 flip-flop 40B is set to the one state the AND circuit 41B passes a wave of 180° phase. Accordingly, at the output leads from the modulators 14 and 15 there may be obtained carrier waves having the phases indicated by each of the vectors 20, 21, 23 and 25 depending upon the binary values set into the flip-flop circuits 40A and 40B. At any given time, only two such waves appear at the output of the modulators 14 and 15 and these are combined in a suitable signal addition circuit. By algebraically combining the waves supplied by the modulators 14 and 15 there appears across the resistor 47 a composite wave having phase corresponding to one of the vectors 22, 24, 26 or 27 of FIG. 8 depending upon the value of the binary digits of the flip-flops 40A and 40B. Lead 19 of FIG. 3 corresponds to that of FIG. 1 and the signal appearing thereon may be applied to a suitable transmission link or storage facility as described above.

In the receiving system of FIG. 2, it was noted above that the wave from the demodulating wave source 31 must have a fixed phase relationship with reference to the received composite signal. There is shown in FIG. 4 one suitable arrangement for achieving a suitable demodulating wave in accordance with the invention. In FIG. 4 the amplified received signal from the amplifier 28 is applied to the demodulating wave source along with signals derived from the output circuit representing the transmitted binary information. The amplified received signal is first applied to a delay line 48 which functions to delay the incoming signal by an amount corresponding to the delay introduced by the low pass filters 33 and 34 of FIG. 2 plus one-half bit time, i.e. one-half the time required to transmit a single digit to bring the wave at the output of the delay line into a proper time relationship with the remainder of the signals applied to the demodulating wave source 31.

The delayed received signal is connected from the delay line 48 to a block designated 90° modulator 49. The output of the 90° modulator 49 is then coupled to a 180° modulator 50 with the output of the 180° modulator 50 being applied to a tuned amplifier 51 from which the demodulating wave signal is applied to the phase detectors of FIG. 2. The signals appearing on the leads 39 of FIG. 2 are applied to an exclusive OR circuit 52 which may comprise a conventional logical circuit for providing an output signal when either of the two input leads are at a "high" binary level, no output signal when both input leads are at a "low" binary voltage level and no output when both of the input leads are at a "high" voltage level.

The 90° modulator 49 functions in accordance with the signal from the exclusive OR circuit 52 to selectively advance or retard the phase of the incoming signal by 90°. When the derived binary information is either "0, 0," or "1, 1" the 90° modulator 49 passes the incoming signal substantially unaffected. On the other hand, when the derived binary information is either "0, 1" or "1, 0" the 90° modulator effects a phase translation of the incoming wave by 90°. This process may be best understood by reference to the vector diagrams of FIGS. 7 and 8.

Figure 7:
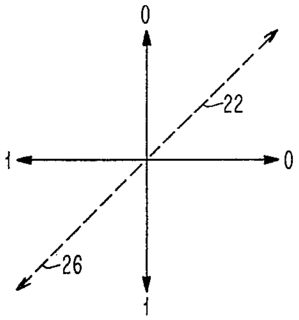
FIG. 7 is a vector diagram illustrating a phase quadrature modulated wave bearing binary coded information.

Essentially the process of reconstructing a sine wave reference is equivalent to reducing the four possible phases represented by the vectors 22, 24, 26, 27 of FIG. 8 to a signal of a single phase independent of the value of the derived data. This process is accomplished in the arrangement of FIG. 4 by two successive phase modulations. First, the phase of the input signal is delayed by 90° when the outputs are "0, 1," and "1, 0" and left unchanged when the outputs are "1, 1" or "0, 0." The resulting signal contains only two phases as shown in FIG. 7. These two phases may then be reduced to one by a conventional phase modulator in the form of 180° modulator 50 of FIG. 4. The 180° modulator 50 is under the control of one of the input leads so that whenever the level of that input lead is "high" representing a binary "1" a 180° phase shift is introduced into the signal from the 90° modulator 49. The result is that the vectors 22 and 26 of FIGS. 7 and 8 are reduced to a single vector thereby indicating a wave of fixed phase irrespective of the derived binary information.

In order to establish initially a proper phase relationship of the wave supplied by the demodulating wave source 31, the transmitter of FIG. 1 may be arranged to transmit a series of signals of like binary value, e.g. "0." The voltages on the leads 39 may be established to correspond to the known series of signals by any suitable switching arrangement (not shown) so that the demodulating wave source 31 is brought into a synchronized relation with the received binary data. Subsequent to the initial series of signals, a reference wave of fixed phase is available for any group or combination of binary values.

The wave from the 180° modulator 50 may be applied to a tuned amplifier 51 and the output of the tuned amplifier 51 may be connected to the phase detectors 29 and 30 of FIG. 2.

FIG. 5 shows a portion of the receiver of FIG. 2 which is adapted to reconstruct a serially appearing binary signal. FIG. 5 corresponds to the two digit parallel-to-serial converter 37 of FIG. 2. The converter 37 receives the signals passed by the low pass filters 33 and 34 of FIG. 2. The parallel-to-series converter 37 includes a pair of AND gates 60 and 61 to which the signals from the low pass filters 33 and 34 are applied, respectively. The AND gates 60 and 61 are momentarily opened by means of clock pulses from a source of clock pulses 62 to pass the incoming signals to a pair of flip-flop circuits 63 and 64. When the signals passed by the AND gates 60 and 61 are of "high" binary value the corresponding flip-flop circuits 63 and 64 are set to "1." On the other hand, when the signals from the AND gates 60 and 61 are of "low" binary value, the inverters 65 and 66 function to set the flip-flops 63 and 64 to a "0" condition. The result is that the derived binary information is set into and registered in the flip-flop circuit 63 and 64. The output signals from the flip-flops 63 and 64 may be directly applied to the demodulating wave generator 31 via the leads 39. In addition, where the information being transmitted comprises serial binary information, the output signals from the flip-flops 63 and 64 may be applied to a pair of AND gates 67 and 68 which are alternately opened to pass signals representing the registrations in the flip-flop circuits 63 and 64. The signals from the AND circuits 67 and 68 are combined by means of an OR circuit 69 to provide on the output lead 38 a binary coded signal appearing serially-by-bit.

In order to open the AND circuits 67 and 68 at the proper times the clock pulses from the source 62 may be applied to a bistable flip-flop 70 via a delay line 71 and a frequency doubler 72. The delay line 71 introduces a delay in the application of the clock pulses to the flip-flop 70 in order to enable the flip-flop circuits 63 and 64, respectively, to be set to register incoming information. The flip-flop 70 reverses its state in response to each pulse supplied by the frequency doubler 72 thereby alternately opening the AND gates 67 and 68 to pass the signals to the OR circuit 69 as described above.

The source of clock pulses 62 is preferably synchronized with the incoming information by applying the output signal from an OR circuit 73 to the source of clock pulses 62. Although any of the many known systems for establishing a self-clocking of digital information may be employed, one suitable arrangement is illustrated in the copending application entitled, "Self-Clocking System for Binary Data Signal," filed July 1, 1959, Serial No. 824,380, in the name of C. M. Melas. In overall operation the arrangements described above in connection with FIGS. 1–8 provide a new and unique method and apparatus for achieving the transmission or storage of binary coded signals by means of phase quadrature modulation with a demodulating wave being self-generated at the receiver in accordance with a comparison between the composite phase modulated wave and the derived binary coded information. Although many circuits are well-known for achieving a synchronous modulation or demodulation there is illustrated in FIG. 9 one suitable circuit for performing the requisite function.

Figure 9:
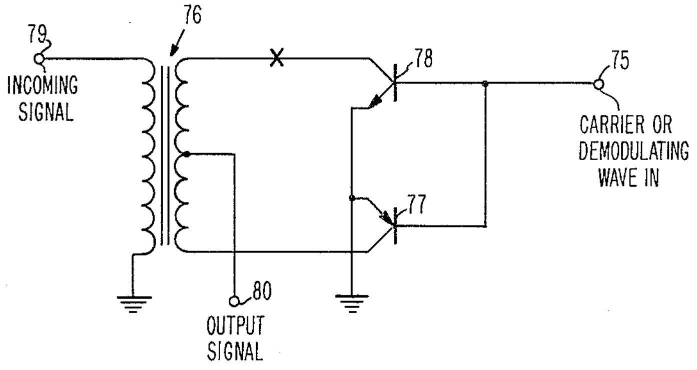
FIG. 9 is a schematic circuit diagram of one type of synchronous demodulator for use in accordance with the present invention.

The circuit of FIG. 9 comprises a balanced modulator, the operation of which is well known. Generally, a signal applied to the terminal 75 depending on its polarity connects either one end of the secondary winding of a transformer 76 to ground or the other end of the secondary winding to ground, through one or the other of the pair of transistors 77 and 78. A reference or demodulating wave may be applied to the terminal 75 while the incoming signal may be applied to the terminal 79. The signal applied to the terminal 79 appears across the secondary winding of the transformer 76 and is reversed in phase when the signal applied to the terminal 75 goes from a negative to a positive value or vice versa. The result is that an output signal appears at a terminal 80 connected to a center tap on a secondary winding of the transformer 76 through a process of synchronous demodulation representing the amplitude of the incoming signal at the corresponding phase indicated by the demodulating wave applied to the terminal 75. The structure of FIG. 9 may be used directly in the system of the present invention to perform the function of the modulators 14 and 15 of FIG. 1, the phase detectors 29 and 30 of FIG. 2, and the modulators 49 and 50 of FIG. 4. In the case of the 90° modulator 49 of FIG. 4 a 90° phase shifter in the form of a delay line may be connected serially with the upper end of the secondary winding at the point marked "X" to selectively achieve the 90° phase shift required to reconstruct the reference wave as described above in connection with the block diagram of FIG. 4 and the vector diagrams of FIGS. 7 and 8.

While the invention has been particularly shown and described with reference to a preferred embodiment thereof, it will be understood by those skilled in the art that various changes in form and details may be made therein without departing from the spirit and scope of the invention.

What is claimed is:

1. In a binary data transmission system the combination of a source of binary coded signals, a source of carrier waves of reference phase, means modulating a wave from said carrier wave source in phase quadrature with respect to said reference phase in accordance with said binary coded signals, a receiver, a transmission link between said modulating means and said receiver, said receiver including demodulating means for deriving said binary coded signals from said phase quadrature modulated wave, and a demodulating wave generator coupled to said demodulating means and responsive to the derived binary coded signals for providing a wave of reference phase with respect to said modulated wave.

2. In a binary data transmission system the combination of a source of binary coded signals appearing serially in time, a serial-to-parallel binary signal converter coupled to said source of binary coded signals for providing parallel signals corresponding to each two successive binary coded signals from said source, a source of carrier waves of reference phase, means phase modulating a wave from said carrier wave source in accordance with a first signal for said serial-to-parallel converter, means phase-modulating a second wave from said carrier wave source in accordance with another signal from said serial-to-parallel converter, means combining the waves from said first and second phase modulating means to provide a phase quadrature modulated wave bearing at least two successively appearing binary coded signals from said source as a function of phase, a transmission link between said combining means and said receiver, said receiver including first demodulating means for deriving one of said binary coded signals from said phase quadrature modulated wave, said receiver also including second demodulating means for deriving another binary coded signal from said phase quadrature modulated carrier wave, and a demodulating wave generator coupled to said first and second demodulating means and responsive to the derived binary coded signals for providing a demodulating wave of reference phase with respect to said phase quadrature modulated wave.

3. In a binary data transmission system, the combination of a source of binary coded signals, a source of carrier waves of reference phase, first means modulating a wave from said carrier wave source in accordance with a first binary coded signal from said source, second means modulating a wave from said carrier wave source in accordance with said second binary coded signal from said source, means combining waves from said first and second modulating means to provide a composite signal having a phase representing at least two binary coded signals, a receiver, a transmission link between said signal combining means and said receiver, said receiver including a first demodulator for deriving said first binary coded signal from said modulated carrier wave, said receiver also including a second demodulator for deriving said second binary coded signal from said modulated carrier wave, and a demodulating wave generator coupled to said first and second demodulators and responsive to the derived binary coded signals for providing a demodulating wave of reference phase with respect to said composite signal.

4. In a binary data transmission system for transmitting binary coded signals via a transmission link, the combination of a source of carrier waves of reference phase, means modulating said carrier waves in accordance with binary coded signals to provide a phase modulated carrier wave bearing at least two binary coded signals, means coupling said modulating means to the transmission link, a receiver coupled to the transmission link, said receiver including demodulating means for deriving said binary coded signals from said phase modulated carrier wave, and a demodulating wave generator coupled to said demodulating means and responsive to the derived binary coded signals for providing a demodulating wave of reference phase with respect to said phase modulated carrier wave.

5. In a binary data transmission system the combination of means generating a phase modulated wave which assumes one of four quadrature related phases with respect to a reference phase in accordance with binary coded information, a receiver adapted to receive said phase modulated wave, said receiver including demodulating means for deriving said binary coded signals from said phase modulated carrier wave, and a demodulating wave generator coupled to said demodulating means and responsive to the derived binary coded signals for the generation of a demodulating wave bearing a predetermined phase relationship to said phase modulated wave.

6. In a binary data transmission system the combination of means generating a phase modulated wave corresponding to binary coded signals, said wave having four discrete phases each corresponding to two bits of binary coded information "0, 0," "0, 1," "1, 0," and "1, 1," respectively, a receiver to which said phase modulated wave is applied, said receiver including a first demodulator for deriving binary coded signals from said phase modulated carrier wave in accordance with one phase relationship, said receiver also including a second demodulator for deriving binary coded signals from said phase modulated carrier wave in accordance with a second phase relationship, and a demodulating wave generator coupled to said first and second demodulators and responsive to the derived binary coded signals for establishing a reference wave for comparison with said phase modulated wave to derive said binary coded signals.

7. In a binary data transmission system the combination of means generating a first wave of reversible phase corresponding to the value of a binary coded signal, means generating a second wave of reversible phase corresponding to another binary coded signal and bearing a phase quadrature relationship with respect to said first wave, means combining said first and second waves to provide a composite signal the phase of which represents at least two binary coded signals, a receiver to which said composite wave is applied, said receiver including a first demodulator for deriving a first binary coded signal from said phase modulated carrier wave, said receiver also including a second demodulator for deriving a second binary coded signal from said phase modulated carrier wave, and a demodulating wave generator coupled to said first and second demodulators and responsive to the derived binary coded signals for providing a reference wave for comparison with said composite signal in the derivation of said binary coded signals.

8. In a binary data transmission system the combination of a source of serially appearing binary coded signals, means generating a first wave of reversible phase corresponding to the value of selected ones of said binary coded signals, means generating a second wave of reversible phase having a phase bearing a quadrature relationship with respect to said first wave and representing other selected ones of said binary coded signals, means combining said first and second waves to provide a composite wave having a phase representing at least two binary coded signals, a receiver to which said composite waves are applied, said receiver including a first demodulator for deriving a first binary coded signal from said phase modulated carrier wave, said receiver also including a second demodulator for deriving another binary coded signal from said phase modulated carrier wave, and a demodulating wave generator coupled to said first and second demodulators and responsive to the derived binary coded signals for providing a reference wave against which the composite wave applied to the receiver is compared in the derivation of said binary coded signals.

9. A receiver for use in a binary data transmission system in which a phase modulated wave carries binary coded signals including the combination of a first synchronous demodulator to which said phase modulated wave is applied for deriving a first binary coded signal, a second synchronous demodulator to which said phase modulated wave is applied for deriving a second binary coded signal, and demodulating wave generator coupled to said first and second synchronous demodulators and responsive to the derived binary coded signals for providing a reference wave with which the phase modulated wave is compared in the derivation of said binary coded signals.

10. A receiver for use in a binary data transmission system in which a quadrature phase modulated wave is synchronously demodulated to provide at least two binary coded signals including the combination of a 90° modulator to which said phase modulated wave is applied, a 180° modulator to which an output signal from said 90° modulator is applied, and means controlling the operation of said 90° and 180° modulators in accordance with binary coded signals derived from said phase modulated wave for generating a reference wave with which said phase modulated wave is compared to derive said binary coded signals.

11. A receiver for use in a binary data transmission system in which a phase modulated carrier comprises at least two quadrature phased components representing separate binary coded signal information, the combination of a first synchronous demodulator to which the phase modulated wave is applied, a second synchronous demodulator to which the phase modulated wave is applied, a source of demodulating waves coupled to said first and second synchronous demodulators for effecting the demodulation of said phase modulated wave in phase quadrature to derive at least two binary coded signals, and means coupled between the output of said first and second demodulators and said demodulating wave source for causing said demodulating wave source to provide a demodulating wave having a fixed phase relationship with respect to said phase modulated wave.

12. A binary data receiver in accordance with claim 11 in which said demodulating wave source comprises a 90° modulator to which the phase modulated wave is applied and a 180° modulator to which the output of said 90° modulator is applied, and means coupling the output of said 180° modulator to said first and second synchronous demodulators to effect said synchronous demodulation of said phase modulated wave.

13. A data receiver in accordance with claim 12 in which said means coupling said first and second demodulators to said demodulating wave source comprises an exclusive "OR" circuit coupled between said first and second synchronous demodulators and said 90° modulator.

14. In a receiver for use in a binary data transmission system in which a phase modulated wave bears at least two binary bits of information by means of quadrature phased components, the combination of a first synchronous demodulator to which the phase modulated wave is applied, a second synchronous demodulator to which the phase modulated wave is applied, means driving said first and second synchronous demodulators in phase quadrature to derive said two bits of binary information from said phase modulated wave, and means comparing said derived binary coded bits with said phase modulated wave to derive a modulating wave of reference phase which is applied to said first and second demodulators in the derivation of said binary coded bits.

15. A method of transmitting binary coded data comprising the steps of generating a phase modulated carrier wave having quadrature phased components each representing two binary coded bits of information, means transmitting said phase modulated carrier wave to a receiver, synchronously demodulating said phase modulated wave with reference to two quadrature phases of a reference wave to derive said two binary coded bits of information, and comparing said derived binary bits of information with said phase modulated wave to derive a reference wave of fixed phase for comparison with said quadrature components of said phase demodulated wave in the derivation of said binary coded bits.

16. A method for deriving a reference wave from binary coded information borne by a phase modulated wave comprising quadrature components each bearing two binary coded bits of information including the combination of the steps of phase modulating said phase modulated wave by 90° in accordance with the appearance of selected combinations of said two binary coded bits in the phase quadrature components of said phase modulated wave, and phase modulating the phase modulated wave by 180° a second successive time in accordance with a selected one of said two binary coded bits borne by said phase quadrature components of said phase modulated wave to provide a reference wave of fixed phase irrespective of the binary coded information borne by the phase quadrature components of said phase modulated wave.

References Cited by the Examiner

UNITED STATES PATENTS

| | | | |
|---|---|---|---|
| 2,977,417 | 3/1961 | Doelz et al. | 178—66 |
| 3,037,568 | 6/1962 | Hannum | 325—320 |
| 3,088,069 | 4/1963 | Markey | 325—49 |
| 3,109,143 | 10/1963 | Gluth | 325—320 |
| 3,112,448 | 11/1963 | McFarlane et al. | 325—163 |
| 3,119,964 | 1/1964 | Crafts | 325—30 |

DAVID G. REDINBAUGH, *Primary Examiner.*

T. G. KEOUGH, S. J. GLASSMAN, *Assistant Examiners.*